(12) United States Patent
Yoon et al.

(10) Patent No.: US 12,442,008 B2
(45) Date of Patent: Oct. 14, 2025

(54) MICROORGANISMS WITH ENHANCED L-BRANCHED-CHAIN AMINO ACIDS PRODUCTIVITY AND METHOD FOR PRODUCING L-BRANCHED-CHAIN AMINO ACIDS USING THE SAME

(71) Applicant: CJ CHEILJEDANG CORPORATION, Seoul (KR)

(72) Inventors: Byoung Hoon Yoon, Seoul (KR); Hyo Jin Kim, Seoul (KR); Seon Hye Kim, Seoul (KR); Hyung Joon Kim, Seoul (KR); Sun Hyoung Choi, Seoul (KR); Ji Hye Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 551 days.

(21) Appl. No.: 17/801,994

(22) PCT Filed: May 6, 2021

(86) PCT No.: PCT/KR2021/005641
§ 371 (c)(1),
(2) Date: Aug. 24, 2022

(87) PCT Pub. No.: WO2021/235742
PCT Pub. Date: Nov. 25, 2021

(65) Prior Publication Data
US 2023/0086419 A1    Mar. 23, 2023

(30) Foreign Application Priority Data

May 21, 2020   (KR) .................. 10-2020-0061174

(51) Int. Cl.
| | |
|---|---|
| C12N 15/77 | (2006.01) |
| C07K 14/34 | (2006.01) |
| C12P 13/06 | (2006.01) |
| C12P 13/08 | (2006.01) |
| C12R 1/15 | (2006.01) |

(52) U.S. Cl.
CPC .............. *C12N 15/77* (2013.01); *C07K 14/34* (2013.01); *C12P 13/06* (2013.01); *C12P 13/08* (2013.01); *C12R 2001/15* (2021.05)

(58) Field of Classification Search
CPC .......... C12P 13/06; C12P 13/08; C12N 15/77; C07K 14/34
See application file for complete search history.

(56) References Cited

U.S. PATENT DOCUMENTS

| | | | |
|---|---|---|---|
| 2006/0228712 A1 | 10/2006 | Nakagawa et al. | |
| 2023/0086419 A1* | 3/2023 | Yoon .................. | C12P 13/06 435/115 |

FOREIGN PATENT DOCUMENTS

| | | |
|---|---|---|
| EP | 3567110 A4 | 11/2019 |
| JP | 2006-149214 A | 6/2006 |
| KR | 10-0220018 B1 | 10/1999 |
| KR | 10-0438146 B1 | 11/2004 |
| KR | 10-0924065 B1 | 10/2009 |
| KR | 10-1117022 B1 | 3/2012 |
| KR | 10-1335789 B1 | 12/2013 |
| KR | 10-1796830 B1 | 11/2017 |
| KR | 10-1851898 B1 | 4/2018 |
| KR | 10-1947945 B1 | 2/2019 |
| RU | 02268941 C2 | 1/2006 |
| WO | 2008/033001 A1 | 3/2008 |

OTHER PUBLICATIONS

Guo et al., "Generation of Branched-chain Amino Acids Resistant *Corynebacterium glutamicum* Acetohydroxy Acid Synthase by Site-directed Mutagenesis," *Biotechnology and Bioprocess Engineering* 19:465-467 (2014).
Zhang et al., "A Novel Mechanism of Transposon-Mediated Gene Activation," *PLoS Genetics* 5(10):e1000689, 10 pages (Oct. 2009).
Pakula et al., "Genetic Analysis of Protein Stability and Function," *Annu. Rev. Genet.* 23:289-310 (1989).
Singer et al., "Genes & Genomes—A changing Perspective," University Science Books, Mill Valley, California, Chapter 1, 4 pages, with partial translation (1998).
Vandecraen et al., "The impact of insertion sequences on bacterial genome plasticity and adaptability," *Critical Reviews in Microbiology* 43(6):709-730 (2017).
Witkowski et al., "Conversion of a β-Ketoacyl Synthase to a Malonyl Decarboxylase by Replacement ofihe Active-Site Cysteine with Giutamine," *Biochemistry* 38:11643-11650 (1999).
Guo et al., "Generation of Branched-chain Amino Acids Resistant *Corynebacterium glutamicum* Acetohydroxy Acid Synthase by Site-directed Mutagenesis," *Biotechnology and Bioprocess Engineering* 19:456-467 (2014).
Kennerknecht et al., "Export of L-Isoleucine from *Corynebacterium glutamicum*: a Two-Gene-Encoded Member of a New Translocator Family," *Journal of Bacteriology* 184(14):3947-3956 (Jul. 2002).
Lange et al., "Global Expression Profiling and Physiological Characterization of *Corynebacterium glutamicum* Grown in the Presence of $_L$-Valine," *Applied and Environmental Microbiology* 69(5):2521-2532 (May 2003).
Mormann et al., "Random mutagenesis in *Corynebacterium glutamicum* ATCC 13032 using an IS6100-based transposon vector identified the last unknown gene in the histidine biosynthesis pathway," *BMC Genomics* 7:205, 20 pages (2006).
Van der Rest et al., "A heat shock following electroporation induces highly efficient transformation of *Corynebacterium glutamicum* with xenogeneic plasmid DNA," *Appl Microbiol Biotechnol* 52:541-545 (1999).

* cited by examiner

Primary Examiner — Tekchand Saidha
(74) Attorney, Agent, or Firm — Seed Intellectual Property Law Group LLP

(57) ABSTRACT

The present application relates to microorganisms with enhanced L-branched-chain amino acid productivity comprising a novel polynucleotide and a method for producing L-branched-chain amino acids using the same.

20 Claims, No Drawings
Specification includes a Sequence Listing.

SEQUENCE LISTING

<160> NUMBER OF SEQ ID NOS: 17

<210> SEQ ID NO 1
<211> LENGTH: 79
<212> TYPE: DNA
<213> ORGANISM: UNKNOWN
<220> FEATURE:
<223> OTHER INFORMATION: polynucleotide

<400> SEQUENCE: 1
caaaggtttg gcagtttcgt ccaataattt cacttttttcc acaaggaaaa aggtgttcta     60
tgacactaat ttcagcaaa                                                   79

<210> SEQ ID NO 2
<211> LENGTH: 11
<212> TYPE: DNA
<213> ORGANISM: Unknown
<220> FEATURE:
<223> OTHER INFORMATION: Polynucleotide

<400> SEQUENCE: 2
cttgagttta g					11

<210> SEQ ID NO 3
<211> LENGTH: 970
<212> TYPE: DNA
<213> ORGANISM: Unknown
<220> FEATURE:
<223> OTHER INFORMATION: Polynucleotide

<400> SEQUENCE: 3
agattgcgcg gatagaaaga tacagggggc cacggtgggg tggtgaacaa gagcaggcac	60 gaggcctggt agatacggat tcgaccaaga aaacgtacac cactcaggag cactcgtgcc	120 tgcccttcca tcctctatca tcgaccccct ctggtgccag ttcgccgcgc tgatcccacc	180 cgtgaccgac acccacccac ttcggtgcca ccgcccacgc atcccggacc ggatcatctt	240 cgacaagctc atccaggtcc tcgtcctcgg cgcctcctat gccaagatcg ccgacacgac	300 atgctcggcc accaccttgc gcacccgccg ggacgagtgg atcaccgctg gcatcttcga	360 gcagctggaa cagatctgtt tggaattcta cgaccgtatc gtcggactcg atctggaaaa	420 cttaagcgtg gacgggtgca tcgtcaaagc ccctgcggt ggtgaagccg ccgggcgatc	480 cccggttgac cggggcaaac aaggcacgaa acgctccctg ctggtcgacg gcgcaggtat	540 cccgcttggg tgcgtggtcg ccggtgccaa ccggcatgac tcaccgttgt tgcgcccgac	600 attggagaaa ctaggccggt tcggactcgc cctgcccgat caaatcaccg tgcatctgga	660 cgccggatac gactcaagca agacccgcag tctgttgacc gaacttggct gcgagtgggt	720 gatcagccag aaagggggtcc cgttgcaggc cggggcccgg tgggtggtgg aacggacgaa	780 ctcgtggcat aaccgcgggt tcaagaaact gcaggtgtgt accgaacgtc gcatccgggt	840 cattgaagcg ttcatttctt tagccaacgc cgtgatcgtt gttcgccggc tggtccggga	900 ggcctggtgc acctatcgct gggagactcg cccgacccaa caaccctgac ctatccgcgc	960 gatctcttag					970

<210> SEQ ID NO 4
<211> LENGTH: 177
<212> TYPE: DNA
<213> ORGANISM: Unknown
<220> FEATURE:
<223> OTHER INFORMATION: Polynucleotide
<220> FEATURE:
<221> NAME/KEY: misc_feature
<222> LOCATION: (177)..(177)
<223> OTHER INFORMATION: n is a, c, g, or t

<400> SEQUENCE: 4
ctaataccgc aaatgggggt agcgggtgtg ttgaggggtg gctggccgga cagggatttg	60 agttttctc taaaaccggc gtgaactggg ggttaactac ctcttcgggg gtggttgggg	120 tggcgggggt agtccttgag gggtggggaa cttatttaaa tacccccgaa aaacaan	177

<210> SEQ ID NO 5
<211> LENGTH: 188

```
<212> TYPE: DNA
<213> ORGANISM: Unknown
<220> FEATURE:
<223> OTHER INFORMATION: Polynucleotide
<220> FEATURE:
<221> NAME/KEY: misc_feature
<222> LOCATION: (188)..(188)
<223> OTHER INFORMATION: n is a, c, g, or t

<400> SEQUENCE: 5
cttgagttta gctaataccg caaatggggg tagcgggtgt gttgaggggt ggctggccgg      60
acagggattt gagtttttct ctaaaaccgg cgtgaactgg gggttaacta cctcttcggg     120
ggtggttggg gtggcggggg tagtccttga ggggtgggga acttatttaa atacccccga     180 aaaacaan                                                              188

<210> SEQ ID NO 6
<211> LENGTH: 153
<212> TYPE: DNA
<213> ORGANISM: Unknown
<220> FEATURE:
<223> OTHER INFORMATION: Polynucleotide

<400> SEQUENCE: 6
gcaaatggac acccgtgcca acatattagc gatccgcctc gactatgttc accccaaag      60 gggaagtaca ctgtacccctt gtcgaatgat tgttactcgt gacgcgccct atgggtgtac    120
cagcacgggt gtaaagcagg aggaaatctg aag                                  153

<210> SEQ ID NO 7
<211> LENGTH: 153
<212> TYPE: DNA
<213> ORGANISM: Unknown
<220> FEATURE:
<223> OTHER INFORMATION: Polynucleotide

<400> SEQUENCE: 7
gcaaatggaa acccgtgcca acatattggc gatccgcctc gactatgttc accccaaag      60 gggaagtaca ctgtacccctt gtcgaatgat tgttactcgt gacgcgccct atgggtgtac    120
cagcacgggt gtaaagcagg aggaaatctg aag                                  153

<210> SEQ ID NO 8
<211> LENGTH: 28
<212> TYPE: DNA
<213> ORGANISM: Artificial sequence
<220> FEATURE:
<223> OTHER INFORMATION: Primer 1

<400> SEQUENCE: 8
ctattctaga caaaggtttg gcagtttc                                         28

<210> SEQ ID NO 9
<211> LENGTH: 30
<212> TYPE: DNA
<213> ORGANISM: Artificial sequence
<220> FEATURE:
<223> OTHER INFORMATION: Primer 2

<400> SEQUENCE: 9
ctattctaga cttcagattt cctcctgctt                                       30

<210> SEQ ID NO 10
<211> LENGTH: 32
<212> TYPE: DNA
```

```
<213> ORGANISM: Artificial Sequence
<220> FEATURE:
<223> OTHER INFORMATION: Primer 3

<400> SEQUENCE: 10
aatttctaga ggcagaccct attctatgaa gg                                32

<210> SEQ ID NO 11
<211> LENGTH: 30
<212> TYPE: DNA
<213> ORGANISM: Artificial sequence
<220> FEATURE:
<223> OTHER INFORMATION: Primer 4

<400> SEQUENCE: 11
agtgtttcgg tctttacaga cacgagggac                                  30

<210> SEQ ID NO 12
<211> LENGTH: 30
<212> TYPE: DNA
<213> ORGANISM: Artificial sequence
<220> FEATURE:
<223> OTHER INFORMATION: Primer 5

<400> SEQUENCE: 12
gtccctcgtg tctgtaaaga ccgaaacact                                  30

<210> SEQ ID NO 13
<211> LENGTH: 32
<212> TYPE: DNA
<213> ORGANISM: Artificial sequence
<220> FEATURE:
<223> OTHER INFORMATION: Primer 6

<400> SEQUENCE: 13
aatttctaga cgtgggagtg tcactcgctt gg                               32

<210> SEQ ID NO 14
<211> LENGTH: 21
<212> TYPE: DNA
<213> ORGANISM: Artificial sequence
<220> FEATURE:
<223> OTHER INFORMATION: Primer 7

<400> SEQUENCE: 14
taccgcaaat gggggtagcg g                                           21

<210> SEQ ID NO 15
<211> LENGTH: 21
<212> TYPE: DNA
<213> ORGANISM: Artificial sequence
<220> FEATURE:
<223> OTHER INFORMATION: Primer 8

<400> SEQUENCE: 15
ccgctacccc catttgcggt a                                           21

<210> SEQ ID NO 16
<211> LENGTH: 1390
<212> TYPE: DNA
<213> ORGANISM: Unknown
<220> FEATURE:
<223> OTHER INFORMATION: polynucleotide

<400> SEQUENCE: 16
caaaggtttg gcagtttcgt ccaataattt cacttttttcc acaaggaaaa aggtgttcta    60
```

```
tgacactaat tcagcaaac ttgagtttag agattgcgcg gatagaaaga tacaggggc     120 cacggtgggg tggtgaacaa gagcaggcac gaggcctggt agatacggat tcgaccaaga    180
aaacgtacac cactcaggag cactcgtgcc tgcccttcca tcctctatca tcgaccccct    240
ctggtgccag ttcgccgcgc tgatcccacc cgtgaccgac acccacccac ttcggtgcca    300
ccgcccacgc atcccggacc ggatcatctt cgacaagctc atccaggtcc tcgtcctcgg    360
cgcctcctat gccaagatcg ccgacacgac atgctcggcc accaccttgc gcacccgccg    420
ggacgagtgg atcaccgctg gcatcttcga gcagctggaa cagatctgtt tggaattcta    480
cgaccgtatc gtcggactcg atctggaaaa cttaagcgtg gacgggtgca tcgtcaaagc    540
cccctgcggt ggtgaagccg ccgggcgatc cccggttgac cggggcaaac aaggcacgaa    600
acgctccctg ctggtcgacg gcgcaggtat cccgcttggg tgcgtggtcg ccggtgccaa    660
ccggcatgac tcaccgttgt tgcgcccgac attggagaaa ctaggccggt tcggactcgc    720
cctgcccgat caaatcaccg tgcatctgga cgccggatac gactcaagca agacccgcag    780
tctgttgacc gaacttggct gcgagtgggt gatcagccag aaaggggtcc cgttgcaggc    840
cggggcccgg tggtggtgg aacggacgaa ctcgtggcat aaccgcgggt tcaagaaact    900
gcaggtgtgt accgaacgtc gcatccgggt cattgaagcg ttcatttctt tagccaacgc    960
cgtgatcgtt gttcgccggc tggtccggga ggcctggtgc acctatcgct gggagactcg   1020
cccgacccaa caaccctgac ctatccgcgc gatctcttag ctaataccgc aaatggggt    1080 agcgggtgtg ttgaggggtg gctggccgga cagggatttg agtttttctc taaaaccggc   1140
gtgaactggg ggttaactac ctcttcgggg gtggttgggg tggcgggggt agtccttgag   1200
gggtggggaa cttatttaaa taccccgaa aaacaaagca atggacacc cgtgccaaca    1260 tattagcgat ccgcctcgac tatgttcacc cccaaagggg aagtacactg taccttgtc    1320 gaatgattgt tactcgtgac gcgccctatg ggtgtaccag cacgggtgta aagcaggagg   1380
aaatctgaag                                                           1390
```

<210> SEQ ID NO 17
<211> LENGTH: 1390
<212> TYPE: DNA
<213> ORGANISM: Unknown
<220> FEATURE:
<223> OTHER INFORMATION: Polynucleotide

<400> SEQUENCE: 17

```
caaaggtttg gcagtttcgt ccaataattt cacttttcc acaaggaaaa aggtgttcta     60
tgacactaat tcagcaaac ttgagtttag agattgcgcg gatagaaaga tacaggggc     120 cacggtgggg tggtgaacaa gagcaggcac gaggcctggt agatacggat tcgaccaaga    180
aaacgtacac cactcaggag cactcgtgcc tgcccttcca tcctctatca tcgaccccct    240
ctggtgccag ttcgccgcgc tgatcccacc cgtgaccgac acccacccac ttcggtgcca    300
ccgcccacgc atcccggacc ggatcatctt cgacaagctc atccaggtcc tcgtcctcgg    360
cgcctcctat gccaagatcg ccgacacgac atgctcggcc accaccttgc gcacccgccg    420
ggacgagtgg atcaccgctg gcatcttcga gcagctggaa cagatctgtt tggaattcta    480
cgaccgtatc gtcggactcg atctggaaaa cttaagcgtg gacgggtgca tcgtcaaagc    540
cccctgcggt ggtgaagccg ccgggcgatc cccggttgac cggggcaaac aaggcacgaa    600
acgctccctg ctggtcgacg gcgcaggtat cccgcttggg tgcgtggtcg ccggtgccaa    660
```

```
ccggcatgac tcaccgttgt tgcgcccgac attggagaaa ctaggccggt tcggactcgc    720
cctgcccgat caaatcaccg tgcatctgga cgccggatac gactcaagca agacccgcag    780
tctgttgacc gaacttggct gcgagtgggt gatcagccag aaaggggtcc cgttgcaggc    840
cggggcccgg tgggtggtgg aacggacgaa ctcgtggcat aaccgcgggt tcaagaaact    900
gcaggtgtgt accgaacgtc gcatccgggt cattgaagcg ttcatttctt tagccaacgc    960
cgtgatcgtt gttcgccggc tggtccggga ggcctggtgc acctatcgct gggagactcg    1020
cccgacccaa caaccctgac ctatccgcgc gatctcttag ctaataccgc aaatgggggt    1080
agcgggtgtg ttgagggtg gctggccgga cagggatttg agtttttctc taaaaccggc    1140
gtgaactggg ggttaactac ctcttcgggg gtggttgggg tggcgggggt agtccttgag    1200
gggtggggaa cttatttaaa tacccccgaa aaacaaggca aatggaaacc cgtgccaaca    1260
tattggcgat ccgcctcgac tatgttcacc cccaaagggg aagtacactg taccettgtc    1320 gaatgattgt tactcgtgac gcgccctatg ggtgtaccag cacgggtgta aagcaggagg    1380
aaatctgaag                                                          1390
```

MICROORGANISMS WITH ENHANCED L-BRANCHED-CHAIN AMINO ACIDS PRODUCTIVITY AND METHOD FOR PRODUCING L-BRANCHED-CHAIN AMINO ACIDS USING THE SAME

STATEMENT REGARDING THE SEQUENCE LISTING

The Sequence Listing associated with this application is provided in text format in lieu of a paper copy, and is hereby incorporated by reference into the specification. The name of the text file containing the Sequence Listing is 200187_490USPC_SEQUENCE_LISTING.txt. The text file is 9238 bytes, was created on Aug. 22, 2022 and is being submitted electronically via EFS-Web.

TECHNICAL FIELD

The present application relates to microorganisms with enhanced L-branched-chain amino acid productivity including a novel polynucleotide and a method for producing L-branched-chain amino acids using the same.

BACKGROUND ART

L-Amino acids are basic structural units of proteins and are used as important materials for pharmaceutical raw materials and food additives, animal feed, nutritional supplements, pesticides, bactericides, etc. In particular, branched-chain amino acids (BCAA) are a generic term for L-valine, L-leucine, and L-isoleucine, which are essential amino acids. The branched-chain amino acids are known to have an antioxidant effect and an effect of directly promoting protein synthesis in muscle cells.

Meanwhile, the branched-chain amino acids are mainly produced by microorganisms of the genus *Escherichia* or the genus *Corynebacterium*, and are known to be biosynthesized from 2-ketoisocaproic acid as a precursor, after undergoing several steps from pyruvic acid (Korean Patent Nos. 10-0220018 and 10-0438146). However, the production of L-branched-chain amino acids by the microorganism has a problem in that it is difficult to perform large-scale industrial production.

DISCLOSURE

Technical Problem

The present inventors have made extensive efforts to prepare microorganisms having enhanced L-branched-chain amino acid productivity including a novel polynucleotide, and as a result, they have confirmed that L-amino acid productivity can be enhanced in a microorganism of the genus *Corynebacterium* into which the polynucleotide is introduced, thereby completing the present application.

Technical Solution

One object of the present application is to provide a microorganism of the genus *Corynebacterium* for producing L-branched-chain amino acids, including a polynucleotide sequence.

Another object of the present application is to provide a composition for producing L-branched-chain amino acids, including a polynucleotide sequence.

Still another object of the present application is to provide a method for producing L-branched-chain amino acids, including: culturing the microorganism of the genus *Corynebacterium*; and recovering L-branched-chain amino acids from the medium or a culture thereof.

Yet another object of the present application is to provide a method for increasing the production of L-branched-chain amino acids, including: adding a polynucleotide sequence to a microorganism.

Even another object of the present application is to provide a use of the polynucleotide sequence for the production of L-branched-chain amino acids.

Further another object of the present application is to provide a use of the microorganism for the production of L-branched-chain amino acids.

Advantageous Effects

When culturing a microorganism for producing L-branched-chain amino acids including the novel polynucleotide of the present application, L-branched-chain amino acids can be produced with high efficiency. In addition, the prepared amino acids can be applied to various products such as human food or food additives, pharmaceuticals, as well as animal feed or animal feed additives.

DETAILED DESCRIPTION OF PREFERRED EMBODIMENTS

Hereinafter, the present application will be described in detail. Meanwhile, each description and embodiment disclosed herein can be applied to other descriptions and embodiments with respect to common features. That is, all combinations of various elements disclosed herein fall within the scope of the present application. Further, the scope of the present application is not limited by the specific description described below.

Additionally, those of ordinary skill in the art may be able to recognize or confirm, using only conventional experimentation, many equivalents to the particular aspects of the invention described herein. Furthermore, it is also intended that these equivalents be included in the present application.

One aspect of the present application provides a microorganism of the genus *Corynebacterium* for producing L-branched-chain amino acids, including a polynucleotide sequence.

As used herein, the term "polynucleotide", which is a polymer of nucleotides composed of nucleotide monomers connected in a lengthy chain by a covalent bond, is a DNA strand having at least a certain length.

For the purpose of the present application, the polynucleotide refers to a polynucleotide involved in increasing the production or production of amino acids, specifically branched-chain amino acids, more specifically amino acids including leucine, valine, and isoleucine, but is not limited thereto.

Additionally, the polynucleotide may be a polynucleotide represented by X—Z—Y—Z' [General Formula 1], in the General Formula 1 above, X may be SEQ ID NO: 1 or a sequence having a homology of 90% or more thereto, Y may be a transposon, Z may be a sequence from 0 to the $n^{th}$ sequence of SEQ ID NO: 5, and Z' may be a sequence from the $n+1^{th}$ sequence of SEQ ID NO: 5 to 188, the last sequence of SEQ ID NO: 5, wherein the $188^{th}$ sequence of SEQ ID NO: 5 may be any one selected from A (adenine), T (thymine), G (guanine), and C (cytosine) as "N", specifically A (adenine) or G (guanine), but is not limited thereto.

The n refers to a natural number including "0". In the above, when n is 0, this means that Y is linked to the 3' side immediately following X. In addition, the Z and Z' may be SEQ ID NO: 5 or a sequence having a homology of 90% or more thereto, but is not limited thereto.

In addition, in General Formula 1 above, Y is a transposon and may consist of SEQ ID NO: 3, which is inserted downstream of the $n^{th}$ sequence of SEQ ID NO: 5, and may be inserted at any position in the sequences of Z and Z'. Specifically, Z and Z', which are sites into which Y is inserted, are sites present at an upstream position of a target gene into which Y can be inserted to increase expression of the target gene, and endogenously, Z and Z' are linked to each other to constitute one upstream, but not limited thereto. These Z and Z' are one continuous sequence, constituting a part of one upstream position inserted to enhance expression of the target gene, and Y is positioned at the 3' end of Z (at the 3' end of X when linked to $0^{th}$ sequence of Z) and at the 5' end of Z', so that they can be separated into Z and Z' from each other. For example, Z and Z' consist of the nucleotide sequence of SEQ ID NO: 5 and has a total 188 nucleotide sequences:

i) when the transposon Y is inserted downstream of the first sequence, the first nucleotide sequence from the 5' end in the nucleotide sequence of SEQ ID NO: 5 becomes Z, and 187 nucleotide sequences excluding one nucleotide sequence from the 5' end in the nucleotide sequence of SEQ ID NO: 5 become Z'. Additionally, ii) when the transposon Y is inserted downstream of the $11^{th}$ sequence, the 11 nucleotide sequences from the 5' end in the nucleotide sequence of SEQ ID NO: 5 become Z, and 177 nucleotide sequences excluding 11 nucleotide sequences from the 5' end in the nucleotide sequence of SEQ ID NO: 5 become Z'. Further, iii) when the transposon Y is inserted downstream of the $187^{th}$ sequence, the 187 nucleotide sequences from the 5' end in the nucleotide sequence of SEQ ID NO: 5 becomes Z, and one nucleotide sequence excluding 187 nucleotide sequences from the 5' end becomes Z', but the above description is only an example, and thus is not limited thereto.

Specifically, when the transposon Y is inserted in the nucleotide sequence following the $11^{th}$ nucleotide sequence, the nucleotide sequence Z may be SEQ ID NO: 2 or a sequence having a homology of 90% or more thereto. Additionally, in the nucleotide sequence of SEQ ID NO: 5, Z', which consists of 177 nucleotide sequence excluding 11 nucleotide sequences from the 5' end, may be SEQ ID NO: 4 or a sequence having a homology of 90% or more thereto, but is not limited thereto. The last sequence of SEQ ID NO: 4 may be any one selected from A (adenine), T (thymine), G (guanine), and C (cytosine) as "N", specifically A (adenine) or G (guanine), but is not limited thereto.

X, Z, or Z' may be included without limitation as long as it is a sequence derived from a microorganism containing the same. Additionally, the nucleotide sequences of SEQ ID NO: 1, SEQ ID NO: 2, SEQ ID NO: 4, and SEQ ID NO: 5 can be confirmed in NCBI Genbank, a known database.

The polynucleotide may be one in which X may be SEQ ID NO: 1 and/or a nucleotide sequence having a homology or identity of at least 70%, 80%, 85%, 90%, 95%, 96%, 97%, 98%, or 99% A or more thereto, and Z and Z' may be SEQ ID NO: 5 and/or a nucleotide sequence having a homology or identity of at least 70%, 80%, 85%, 90%, 95%, 96%, 97%, 98%, or 99% or more thereto, wherein the polynucleotide sequence having homology or identity may be those in the above range, excluding a sequence having 100% identity, or may be a sequence having less than 100% identity.

For the purpose of the present application, the polynucleotide refers to one that can serve to increase the production of L-branched-chain amino acids as long as the transposon Y is inserted into a sequence derived from a microorganism including X, Z and Z'.

In addition, SEQ ID NO: 6, SEQ ID NO: 7 or a sequence having a homology of 90% or more thereto may be additionally included at the 3' end of Z', but is not limited thereto. Specifically, the polynucleotide is not limited as long as it is a microorganism-derived sequence including SEQ ID NO: 6, SEQ ID NO: 7, or a sequence having a homology of 90% or more thereto at the 3' end of Z'.

In one example, among the polynucleotide sequence represented by General Formula 1 above, the sequence including the sequence of X—Z—Z' without Y, which is a transposon, and the sequence added to the 3' end of Z' may correspond to the upstream sequence of NCgl2472, but is not limited thereto.

Specifically, the polynucleotide sequence represented by General Formula 1 above may be SEQ ID NO: 16 or SEQ ID NO: 17, but is not limited thereto.

As used herein, the term "homology" or "identity" refers to a degree of relatedness between two given nucleotide sequences, and may be expressed as a percentage.

The terms homology and identity may often be used interchangeably with each other.

The sequence homology or identity of conserved polynucleotide sequences may be determined by standard alignment algorithms and can be used with a default gap penalty established by the program being used. Substantially, homologous or identical sequences are generally expected to hybridize to all or at least about 50%, 60%, 70%, 80%, or 90% of the entire length of the sequences under moderate or high stringent conditions. Polynucleotides that contain degenerate codons instead of codons in hybridizing polynucleotides are also considered.

Whether any two polynucleotide sequences have a homology, similarity or identity may be, for example, determined by a known computer algorithm such as the "FASTA" program using default parameters (Pearson et al., (1988) *Proc. Matt. Acad. Sci. USA* 85:2444). Alternatively, it may be determined by the Needleman—Wunsch algorithm (Needleman and Wunsch, 1970, *J. Mol. Biol.* 48:443-453), which is performed using the Needleman program of the EMBOSS package (EMBOSS: The European Molecular Biology Open Software Suite, Rice et al., 2000, Trends Genet. 16:276-277) (version 5.0.0 or versions thereafter) (GCG program package (Devereux, J. et al., *Nucleic Acids Research* 12:387 (1984)), BLASTP, BLASTN, FASTA (Atschul, S. F. et al., *J MOLEC BIOL* 215:403 (1990); Guide to Huge Computers, Martin J. Bishop, ed., Academic Press, San Diego, 1994, and CARILLO et al. (1988) SIAM J *Applied Math* 48:1073). For example, the homology, similarity or identity may be determined using BLAST or ClustalW of the National Center for Biotechnology Information (NCBI).

The homology, similarity or identity of polynucleotides may be determined by comparing sequence information using, for example, the GAP computer program, such as Needleman et al. (1970), *J Mol Biol.* 48:443 as disclosed in Smith and Waterman, *Adv. Appl. Math* (1981) 2:482. In summary, the GAP program defines the homology, similarity or identity as the value obtained by dividing the number of similarly aligned symbols (i.e., nucleotides or amino acids) by the total number of the symbols in the shorter of the two sequences. Default parameters for the GAP program may include (1) a unary comparison matrix (containing a value of 1 for identities and 0 for non-identities) and the weighted comparison matrix of Gribskov et al. (1986), *Nucl. Acids Res.* 14:6745, as disclosed in Schwartz and Dayhoff, eds., *Atlas of Protein Sequence and Structure*, National Biomedical Research Foundation, pp. 353-358 (1979) (or EDNAFULL substitution matrix (EMBOSS version of NCBI NUC4.4)); (2) a penalty of 3.0 for each gap and an additional 0.10 penalty for each symbol in each gap (or a gap opening penalty of 10 and a gap extension penalty of 0.5); and (3) no penalty for end gaps. Therefore, the term "homology" or "identity", as used herein, represents relatedness between sequences.

Additionally, the polynucleotide of the present application may undergo various modifications in the coding region within the scope that does not change the polynucleotide sequence, due to codon degeneracy or in consideration of the codons preferred in an organism in which the polynucleotide is to be expressed. Additionally, the polynucleotide of the present application may include a probe that may be prepared from a known gene sequence, for example, any polynucleotide sequence which can hybridize with a sequence complementary to all or part of the nucleotide sequence under stringent conditions such that at least one nucleotide is substituted with another nucleotide in the nucleotide sequence of SEQ ID NO: 1 and/or SEQ ID NO: 3, and has a promoter activity without limitation. The "stringent conditions" refers to conditions under which specific hybridization between polynucleotides is allowed. Such conditions are specifically described in the literature (e.g., J. Sambrook et al.). For example, the stringent conditions may include conditions under which genes having a high homology or identity of 40% or higher, specifically 70% or higher, 80% or higher, 85% or higher, 90% or higher, more specifically 95% or higher, much more specifically 97% or higher, still much more specifically 99% or higher are hybridized with each other and genes having a homology or identity lower than the above homologies or identities are not hybridized with each other, or washing conditions of Southern hybridization, that is, washing once, specifically twice or three times at a salt concentration and a temperature corresponding to 60° C., 1×SSC, 0.1% SDS, specifically 60° C., 0.1×SSC, 0.1% SDS, and more specifically 68° C., 0.1×SSC, 0.1% SDS.

Hybridization requires that two nucleic acids contain complementary sequences, although mismatches between bases are possible depending on the stringency of the hybridization. The term "complementary" is used to describe the relationship between nucleotide bases that can hybridize with each other. For example, with respect to DNA, adenine is complementary to thymine, and cytosine is complementary to guanine. Therefore, the polynucleotide of the present application may include isolated nucleotide fragments complementary to the entire sequence as well as nucleic acid sequences substantially similar thereto.

Specifically, the polynucleotides having a homology or identity may be detected using the hybridization conditions including a hybridization step at a $T_m$ value of 55° C. under the above-described conditions. Further, the $T_m$ value may be 60° C., 63° C., or 65° C., but is not limited thereto, and may be appropriately adjusted by those skilled in the art depending on the purpose thereof.

The appropriate stringency for hybridizing polynucleotides depends on the length of the polynucleotides and the degree of complementation, and these variables are well known in the art (see Sambrook et al., supra, 9.50-9.51, 11.7-11.8).

As used herein, the term "microorganism containing a polynucleotide" refers to a microorganism having branched-chain amino acid productivity naturally or a microorganism to which branched-chain amino acid productivity is imparted to a parent strain without branched-chain amino acid productivity. Specifically, the microorganism may be a microorganism for producing L-branched-chain amino acids including the polynucleotide of X—Z—Y—Z' [General Formula 1], but is not limited thereto. Specifically, in the microorganism, the polynucleotide is represented by the General Formula X—Z—Y—Z', in the General Formula 1 above, X is SEQ ID NO: 1 or a sequence having a homology of 90% or more thereto, Y is a transposon, and Z and Z' may be SEQ ID NO: 5 or a sequence having a homology of 90% or more thereto.

For the purpose of the present application, the microorganism may be any microorganism capable of producing branched-chain amino acids including the polynucleotide.

In the present application, the "microorganism capable of producing branched-chain amino acids" may be used interchangeably with "microorganism producing branched-chain amino acids" and "microorganism having branched-chain amino acid productivity".

As used herein, the term "branched-chain amino acid" refers to an amino acid with a branched alkyl group on the side chain, and it includes valine, leucine, and isoleucine. Specifically, in the present application, the branched-chain amino acid may be L-branched-chain amino acid, and the L-branched-chain amino acid may be L-valine or L-leucine, but is not limited thereto.

As used herein, the term "microorganism producing branched-chain amino acids" includes all wild-type microorganisms, or naturally or artificially genetically modified microorganisms, which may be a microorganism in which a particular mechanism is weakened or enhanced due to insertion of a foreign gene, or enhancement or inactivation of the activity of an endogenous gene, and it may be a microorganism in which genetic mutation occurs or activity is enhanced for the production of desired branched-chain amino acids. For the purpose of the present application, the microorganism producing branched-chain amino acids is characterized in that the desired branched-chain amino acid productivity is increased by including the polynucleotide, and specifically, it may be a microorganism of the genus *Corynebacterium*. Specifically, in the present application, a microorganism producing branched-chain amino acids or a microorganism having branched-chain amino acid productivity may be a microorganism in which part of a gene in a biosynthesis pathway of branched-chain amino acids is enhanced or weakened, or in which part of a gene in a degradation pathway of branched-chain amino acids is enhanced or weakened, but is not limited thereto.

As used herein, the term "microorganism of the genus *Corynebacterium* for producing L-branched-chain amino acids" may be a microorganism of the genus *Corynebacterium* having branched-chain amino acid productivity naturally or by modification. Specifically, in the present application, the microorganism of the genus *Corynebacterium* having branched-chain amino acid productivity may refer to a microorganism of the genus *Corynebacterium* which contains the polynucleotide of the present application or is transformed with a vector containing a gene encoding the polynucleotide, thereby having enhanced branched-chain amino acid productivity. The "microorganism of the genus

*Corynebacterium* having enhanced branched-chain amino acid productivity" may refer to a microorganism whose branched-chain amino acid productivity is enhanced as compared to that of a parent strain before transformation or a non-modified microorganism. The "non-modified microorganism" may refer to a natural strain itself, a microorganism that does not contain the polynucleotide of the present application, or a microorganism that is not transformed with a vector containing the gene encoding the polynucleotide and the target protein.

In the present application, the "microorganism of the genus *Corynebacterium*" may specifically be *Corynebacterium glutamicum, Corynebacterium ammoniagenes, Brevibacterium lactofermentum, Brevibacterium flavum, Corynebacterium thermoaminogenes, Corynebacterium efficiens, Corynebacterium stationis*, etc., but is not limited thereto.

Another aspect of the present application provides a composition for producing L-branched-chain amino acids, including the polynucleotide sequence.

The composition for producing L-branched-chain amino acids means a composition capable of producing L-branched-chain amino acids by the polynucleotide of the present application. For example, the composition includes the polynucleotide, and may further include, without limitation, a constitution capable of operating the polynucleotide. The polynucleotide may be in a form included in a vector to allow expression of an operably linked gene in an introduced host cell.

Still another aspect of the present application provides a method for producing L-branched-chain amino acids, including: culturing the microorganism of the genus *Corynebacterium* in a medium; and recovering L-branched-chain amino acids from the medium or a culture thereof.

In the method above, the step of culturing the microorganism may be performed by a known batch culture method, continuous culture method, fed-batch culture method, etc., but is not particularly limited thereto. In particular, with respect to the culture conditions, the pH of the culture may be adjusted to a suitable pH (e.g., pH 5 to 9, specifically pH 6 to 8, and most specifically pH 6.8) using a basic compound (e.g., sodium hydroxide, potassium hydroxide, or ammonia) or acidic compound (e.g., phosphoric acid or sulfuric acid), but is not particularly limited thereto. Additionally, oxygen or an oxygen-containing gas mixture may be injected into the culture in order to maintain an aerobic state. The culture temperature may be maintained at 20° C. to 45° C., specifically at 25° C. to 40° C., and the culturing may be performed for about 10 to 160 hours, but the culture is not limited to the above. The amino acids produced by the culture may be secreted into the medium or may remain in the cells.

Further, as a carbon source for the culture medium to be used, sugars and carbohydrates (e.g., glucose, sucrose, lactose, fructose, maltose, molasses, starch, and cellulose), oils and fats (e.g., soybean oil, sunflower seed oil, peanut oil, and coconut oil), fatty acids (e.g., palmitic acid, stearic acid, and linoleic acid), alcohols (e.g., glycerol and ethanol), and organic acids (e.g., acetic acid) may be used alone or in combination, but is not limited thereto. As a nitrogen source, nitrogen-containing organic compounds (e.g., peptone, yeast extract, meat gravy, malt extract, corn steep liquor, soybean flour, and urea) or inorganic compounds (e.g., ammonium sulfate, ammonium chloride, ammonium phosphate, ammonium carbonate, and ammonium nitrate) may be used alone or in combination, but is not limited thereto. As a phosphorus source, potassium dihydrogen phosphate, dipotassium hydrogen phosphate, corresponding sodium-containing salts thereof, etc. may be used alone or in combination, but is not limited thereto. In addition, essential growth-promoting materials such as other metal salts (e.g., magnesium sulfate or iron sulfate), amino acids, and vitamins may be contained in the medium.

In the method for recovering the amino acids produced in the culturing step of the present application, the desired amino acids may be collected from the cultured solution using an appropriate method known in the art according to the culture method. For example, centrifugation, filtration, anion-exchange chromatography, crystallization, and HPLC may be used, and the desired amino acids may be collected from the medium or the microorganism using an appropriate method known in the art.

Additionally, the recovering step may further include a purification process, and it may be performed using an appropriate method known in the art. Thus, the recovered amino acids may be in a purified state or in the form of a microbial fermentation solution containing the amino acids (*Introduction to Biotechnology and Genetic Engineering*, A. J. Nair., 2008).

Additionally, for the purpose of the present application, the microorganism containing the polynucleotide having a promoter activity is characterized in that the production of branched-chain amino acids including valine, leucine or isoleucine is increased. This is significant in that the production of branched-chain amino acids can be increased through the polynucleotide having a promoter activity of the present application, compared to the wild-type strain of the genus *Corynebacterium* that cannot produce branched-chain amino acids or can produce the same in a very trace amount.

Yet another aspect of the present application provides a method for increasing the production of L-branched-chain amino acids, including: adding the polynucleotide sequence to a microorganism.

Even another aspect of the present application provides a use of the polynucleotide sequence for the production of L-branched-chain amino acids.

Further another aspect of the present application provides a use of the microorganism for the production of L-branched-chain amino acids.

The "increase in the production of L-branched-chain amino acids" refers to an increase in the L-branched-chain amino acid productivity which allows the production of L-branched-chain amino acids with high yield, as compared to a microorganism before including the polynucleotide sequence, that is, a non-modified microorganism.

The "polynucleotide" and "L-branched-chain amino acids" are the same as described above.

MODE FOR CARRYING OUT THE INVENTION

Hereinafter, the present application will be described in detail by way of Examples. However, these Examples are given for illustrative purposes only, and the scope of the invention is not intended to be limited to or by these Examples.

Example 1: Selection of Mutant Strains for Increasing Valine Productivity by Random Mutagenesis Example 1-1: Induction of Random Mutation by UV Irradiation In order to select mutant strains with increased valine productivity, the valine-producing strain of *Corynebacterium glutamicum* KCCM11201P (Korean Patent No.

10-1117022) was plated on a nutrient medium containing agar and cultured at 30° C. for 36 hours. Hundreds of the thus-obtained colonies were irradiated with UV at room temperature to induce a random mutation on the genome in the strain.

Example 1-2: Experiment on Fermentation Titer of Mutation-Inducing Strains and Selection of Strains The experiment on fermentation titer of the strains, in which the random mutation had been induced, was carried out in order to select mutant strains with increased L-valine productivity compared to the *Corynebacterium glutamicum* KCCM11201P used as the parent strain. Each colony was sub-cultured in a nutrient medium, and then each strain was seeded into a 250 mL corner-baffle flask containing 25 mL of a production medium and cultured at 30° C. for 72 hours at 200 rpm with shaking. Thereafter, the concentration of L-valine was analyzed using HPLC, and the analyzed concentration of L-valine is shown in Table 1 below.
<Nutrient Medium (pH 7.2)>
  Glucose 10 g, Meat Extract 5 g, Polypeptone 10 g, Sodium Chloride 2.5 g, Yeast Extract 5 g, Agar 20 g, Urea 2 g (based on 1 L of distilled water)
<Production Medium (pH 7.0)>
  Glucose 100 g, $(NH_4)_2SO_4$ 40 g, Soy Protein 2.5 g, Corn Steep Solids 5 g, Urea 3 g, $KH_2PO_4$ 1 g, $MgSO_4\cdot 7H_2O$ 0.5 g, Biotin 100 μg, Thiamine-HCl 1 mg, Calcium Pantothenate 2 mg, Nicotinamide 3 mg, $CaCO_3$ 30 g (based on 1 L of distilled water)

TABLE 1

|  | Name of Strains | L-Valine (g/L) |
|---|---|---|
| Control Group | KCCM11201P | 2.8 |
| Experimental Group | C1 | 3.1 |
|  | C2 | 2.7 |
|  | C3 | 2.3 |
|  | C4 | 3.4 |
|  | C5 | 3.2 |
|  | C6 | 3.3 |
|  | C7 | 2.9 |
|  | C8 | 2.4 |
|  | C9 | 3.1 |
|  | C10 | 4.0 |
|  | C11 | 1.2 |
|  | C12 | 3.0 |
|  | C13 | 2.6 |
|  | C14 | 3.7 |
|  | C15 | 3.5 |

With reference to Table 1, compared to the control KCCM11201P strain, the C10 strain with the greatest increase in valine production was selected.

Example 2: Confirmation of Mutation Through Gene Sequencing

The major genes of the C10 strain with increased valine productivity were sequenced and compared with those of the KCCM11201P strain and the wild-type strain of *Corynebacterium glutamicum* ATCC14067. As a result, it was confirmed that the C10 strain contained a transposon at a specific position.
Specifically, in C10, it was confirmed that the transposon represented by SEQ ID NO: 3 was inserted at the 3' end of the 11$^{th}$ sequence of SEQ ID NO: 5.
In the following examples, it was attempted to determine whether the transposon inserted at the specific position affects the production of branched-chain amino acids of the microorganisms of the genus *Corynebacterium*, i.e., valine, isoleucine, and leucine.

Example 3: Preparation of Transposon-Inserted Strains and Evaluation of Valine Productivity Thereof Example 3-1: Preparation of Transposon-Inserted Strain from *Corynebacterium glutamicum* KCCM11201P and Evaluation of L-Valine Productivity Thereof In order to insert the transposon represented by SEQ ID NO: 3 into *Corynebacterium glutamicum* KCCM11201P, a vector containing a target mutation was prepared. In detail, genomic DNA of the C10 strain was extracted using a G-spin Total DNA extraction mini kit (intron, Cat. No. 17045) according to the protocol provided in the kit, and the genomic DNA was used as a template to perform PCR. PCR conditions are as follows: denaturation at 94° C. for 5 minutes, and then 25 cycles of denaturation at 94° C. for 30 seconds; annealing at 55° C. for 30 seconds; and polymerization at 72° C. for 150 seconds, followed by polymerization at 72° C. for 7 minutes, and a PCR product of 1485 bp was obtained using primer 1 of SEQ ID NO: 8 and primer 2 of SEQ ID NO: 2 (hereinafter referred to as "mutation-introduced fragment 1").

The obtained mutation-introduced fragment 1 was treated with XbaI restriction enzyme (New England Biolabs, Beverly, MA), and then ligated into a pDZ vector (Korean Patent No. 10-0924065 and International Publication No. WO 2008-033001), which had been treated with the same restriction enzyme, using T4 ligase (New England Biolabs, Beverly, MA). The prepared gene was transformed into *E. coli* DH5a, and then selected on an LB medium containing kanamycin. DNA was obtained using a DNA-spin plasmid DNA purification kit (iNtRON), and pDZ-PNCgl2472(Tn) vector containing the mutation-introduced fragment 1 was prepared.

TABLE 2

| Primers | Nucleotide Sequence | SEQ ID NO: |
|---|---|---|
| Primer 1 | CTATTCTAGACAAAGGTTTGGCAGTTTC | 8 |
| Primer 2 | CTATTCTAGACTTCAGATTTCCTCCTGCTT | 9 |

Thereafter, the pDZ-PNCgl2472(Tn) was transformed into the *Corynebacterium glutamicum* KCCM11201P by homologous recombination on the chromosome (van der Rest et al., *Appl Microbiol Biotechnol* 52:541-545, 1999). The strain introduced with the vector on the chromosome by homologous recombination was selected in a medium containing 25 mg/L kanamycin. Then, a strain in which the transposon of SEQ ID NO: 3 was inserted at the 3' end of the 11$^{th}$ sequence of SEQ ID NO: 5 was confirmed through PCR using primer 1 of SEQ ID NO: 8 and primer 2 of SEQ ID NO: 9 based on the *Corynebacterium glutamicum* transformant in which the secondary recombination was completed. The recombinant strain *Corynebacterium glutamicum* KCCM11201P-PNCgl2472-Tn was named CA08-1533 and deposited with an Accession No. KCCM12707P.

Flask evaluation was performed to compare the valine productivity of the valine-producing strains, *Corynebacterium glutamicum* KCCM11201P and CA08-1533. Each strain was sub-cultured in a nutrient medium, and then each strain was seeded into a 250 mL corner-baffle flask containing 25 mL of a production medium and cultured at 30° C. for 72 hours at 200 rpm with shaking. Thereafter, the concentration of L-valine was analyzed using HPLC, and the analyzed concentration of L-valine is shown in Table 3 below.

<Nutrient Medium (pH 7.2)>
  Glucose 10 g, Meat Extract 5 g, Polypeptone 10 g, Sodium Chloride 2.5 g, Yeast Extract 5 g, Agar 20 g, Urea 2 g (based on 1 L of distilled water)
<Production Medium (pH 7.0)>
  Glucose 100 g, $(NH_4)_2SO_4$ 40 g, Soy Protein 2.5 g, Corn Steep Solids 5 g, Urea 3 g, $KH_2PO_4$ 1 g, $MgSO_4 \cdot 7H_2O$ 0.5 g, Biotin 100 μg, Thiamine-HCl 1 mg, Calcium Pantothenate 2 mg, Nicotinamide 3 mg, $CaCO_3$ 30 g (based on 1 L of distilled water)

TABLE 3

L-Valine Productivity of KCCM11201P and CA08-1533

| Strains | L-Valine (g/L) | | | |
|---|---|---|---|---|
| | Batch 1 | Batch 2 | Batch 3 | Average |
| KCCM11201P | 2.7 | 2.7 | 2.8 | 2.7 |
| CA08-1533 | 2.9 | 2.9 | 3 | 2.9 |

As a result, it was confirmed that the L-valine productivity of the CA08-1533 strain was increased by 7.4% compared to KCCM11201P.

Example 3-2: Preparation of Transposon-Inserted Strain from *Corynebacterium glutamicum* CJ7V and Evaluation of L-Valine Productivity Thereof In order to examine whether the effect of increasing L-valine productivity is also shown in other L-valine-producing *Corynebacterium glutamicum* strains, one kind of a mutation (ilvN(A42V); Biotechnology and Bioprocess Engineering, June 2014, Volume 19, issue 3, pp. 45-467) was introduced into a wild-type *Corynebacterium glutamicum* ATCC14067 to prepare a strain having improved L-valine productivity.

In detail, genomic DNA of the wild-type *Corynebacterium glutamicum* ATCC14067 strain was extracted using a G-spin Total DNA extraction mini kit (intron, Cat. No. 17045) according to the protocol provided in the kit. The genomic DNA was used as a template to perform PCR. To construct a vector for introducing A42V mutation into ilvN gene, a primer set of primer 3 (SEQ ID NO: 10) and primer 4 (SEQ ID NO: 11) and a primer set of primer 5 (SEQ ID NO: 12) and primer 6 (SEQ ID NO: 13) were used to obtain DNA fragments (A, B), respectively. PCR conditions are as follows: denaturation at 94° C. for 5 minutes and then 25 cycles of denaturation at 94° C. for 30 seconds; annealing at 55° C. for 30 seconds; and polymerization at 72° C. for 60 seconds, followed by polymerization at 72° C. for 7 minutes.

As a result, A and B fragments, each having a polynucleotide of 537 bp, were obtained. Overlapping PCR was performed based on these two fragments as a template using primer 3 of SEQ ID NO: 10 and primer 6 of SEQ ID NO: 13. A PCR product of 1044 bp was obtained (hereinafter referred to as "mutation-introduced fragment 2").

The obtained mutation-introduced fragment 2 was treated with XbaI restriction enzyme (New England Biolabs, Beverly, MA), and then ligated into a pDZ vector, which had been treated with the same restriction enzyme, using T4 ligase (New England Biolabs, Beverly, MA). The prepared gene was transformed into *E. coli* DH5a, and then selected on an LB medium containing kanamycin. DNA was obtained using a DNA-spin plasmid DNA purification kit (iNtRON). The vector for introducing A42V mutation into the ilvN gene was named pDZ-ilvN(A42V).

TABLE 4

| Primers | Nucleotide Sequences | SEQ ID NO: |
|---|---|---|
| Primer 3 | AATTTCTAGAGGCAGACCCTATTCTATGAAGG | 10 |
| Primer 4 | AGTGTTTCGGTCTTTACAGACACGAGGGAC | 11 |
| Primer 5 | GTCCCTCGTGTCTGTAAAGACCGAAACACT | 12 |
| Primer 6 | AATTTCTAGACGTGGGAGTGTCACTCGCTTGG | 13 |

Thereafter, the pDZ-ilvN(A42V) was transformed into the wild-type *Corynebacterium glutamicum* ATCC14067 by homologous recombination on the chromosome (van der Rest et al., *Appl Microbiol Biotechnol* 52:541-545, 1999). The strain introduced with the vector on the chromosome by homologous recombination was selected in a medium containing 25 mg/L kanamycin.

The gene fragment was amplified based on the *Corynebacterium glutamicum* transformant in which the secondary recombination was completed by PCR using primer 3 of SEQ ID NO: 10 and primer 6 of SEQ ID NO: 13, and the mutation-introduced strain was confirmed by sequencing analysis. The recombinant strain was named *Corynebacterium glutamicum* CJ7V.

Lastly, a strain transformed with pDZ-PNCgl2472(Tn) was prepared in the same manner as in Example 3-1 based on the *Corynebacterium glutamicum* CJ7V, and named CJ7V-PNCgl2472-Tn. Specifically, in CJ7V-PNCgl2472-Tn, it was confirmed that the transposon represented by SEQ ID NO: 3 was inserted at the 3' end of the $11^{th}$ sequence of SEQ ID NO: 5.

In order to compare L-valine productivity of the prepared strains, the strains were cultured in the same manner as in Example 3-1, and then L-valine concentration was analyzed, and the analyzed L-valine concentrations are shown in Table 5 below.

TABLE 5

L-Valine Productivity of CJ7V and CJ7V-PNCgl2472-Tn

| Strains | L-Valine (g/L) | | | |
|---|---|---|---|---|
| | Batch 1 | Batch 2 | Batch 3 | Average |
| CJ7V | 3.5 | 3.5 | 3.6 | 3.5 |
| CJ7V-PNCgl2472-Tn | 3.8 | 3.9 | 3.9 | 3.9 |

As a result, it was confirmed that the L-valine productivity of the CJ7V-NCgl2472(Tn) strain was increased by 9.4% compared to CJ7V.

Example 3-3: Preparation of Transposon-Inserted Strain from *Corynebacterium glutamicum* CJ8V and Evaluation of L-Valine Productivity Thereof In order to examine whether the effect of increasing L-valine productivity is also shown in other L-valine-producing *Corynebacterium glutamicum* strains, one kind of a mutation (ilvN(A42V)) was introduced into a wild-type *Corynebacterium glutamicum* ATCC13869 to prepare a strain having L-valine productivity, and the recombinant strain was named *Corynebacterium glutamicum* CJ8V.

In order to insert the transposon represented by SEQ ID NO: 3 into the *Corynebacterium glutamicum* CJ8V, a vector containing a target mutation was prepared. In detail, genomic DNA of the C10 strain was extracted using a G-spin Total DNA extraction mini kit (intron, Cat. No. 17045) according to the protocol provided in the kit, and the genomic DNA was used as a template to perform PCR. PCR conditions are as follows: denaturation at 94° C. for 5 minutes, and then 25 cycles of denaturation at 94° C. for 30 seconds; annealing at 55° C. for 30 seconds; and polymerization at 72° C. for 150 seconds, followed by polymerization at 72° C. for 7 minutes, and a PCR product of 1082 bp (fragment A') was obtained using primer 1 of SEQ ID NO: 8 and primer 7 of SEQ ID NO: 14. Additionally, genomic DNA of the ATCC13869 strain was extracted using a G-spin Total DNA extraction mini kit (intron, Cat. No. 17045) according to the protocol provided in the kit, and the genomic DNA was used as a template to perform PCR. PCR conditions are as follows: denaturation at 94° C. for 5 minutes, and then 25 cycles of denaturation at 94° C. for 30 seconds; annealing at 55° C. for 30 seconds; and polymerization elongation at 72° C. for 150 seconds, followed by elongation at 72° C. for 7 minutes, and a PCR product of 328 bp (fragment B') was obtained using primer 2 of SEQ ID NO: 9 and primer 8 of SEQ ID NO: 15. Overlapping PCR was performed based on these two fragments as a template using primer 1 (SEQ ID NO: 8) and primer 2 (SEQ ID NO: 9). A PCR product of 1390 bp was obtained (hereinafter referred to as "mutation-introduced fragment 3").

The obtained mutation-introduced fragment 3 was treated with XbaI restriction enzyme (New England Biolabs, Beverly, MA), and then ligated into a pDZ vector (Korean Patent No. 10-0924065 and International Publication No. WO 2008-033001), which had been treated with the same restriction enzyme, using T4 ligase (New England Biolabs, Beverly, MA). The prepared gene was transformed into *E. coli* DH5a, and then selected on an LB medium containing kanamycin. DNA was obtained using a DNA-spin plasmid DNA purification kit (iNtRON), and pDZ-PNCgl2472 (Tn)-1 vector containing the mutation-introduced fragment 3 was prepared. The primer sequences used are shown in Table 6 below.

TABLE 6

| Primers | Nucleotide Sequences | SEQ ID NO: |
|---------|----------------------|------------|
| Primer 7 | TACCGCAAATGGGGGTAGCGG | 14 |
| Primer 8 | CCGCTACCCCCATTTGCGGTA | 15 |

The pDZ-PNCgl2472(Tn)-1 was transformed into the L-valine-producing strain, *Corynebacterium glutamicum* CJ8V, by homologous recombination on the chromosome in the same manner as in Example 3-1, and named CJ8V-PNCgl2472-Tn-1. Specifically, in CJ8V-PNCgl2472-Tn-1, it was confirmed that the transposon represented by SEQ ID NO: 3 was inserted at the 3' end of the 11$^{th}$ sequence of SEQ ID NO: 5.

In order to confirm the L-valine productivity of the CJ8V-PNCgl2472-Tn-1 strain prepared above, the strain was cultured in the same manner as in Example 3-1 to analyze the concentration of L-valine, and the analyzed L-valine concentration is shown in Table 7 below.

TABLE 7

L-Valine Productivity of CJ8V and CJ8V-PNCgl2472-Tn

| | L-Valine (g/L) | | | |
|---|---|---|---|---|
| Strains | Batch 1 | Batch 2 | Batch 3 | Average |
| CJ8V | 3.5 | 3.5 | 3.4 | 3.5 |
| CJ8V-PNCgl2472-Tn-1 | 3.7 | 3.9 | 3.7 | 3.8 |

As a result, it was confirmed that the L-valine productivity of the CJ8V-PNCgl2472-Tn-1 strain was increased by 8.7% compared to CJ8V.

Example 4: Preparation of Transposon-Inserted Strains from L-Leucine-Producing Strains of *Corynebacterium glutamicum* KCCM11661P, KCCM11662P and Evaluation of L-Leucine Productivity Thereof The pDZ-PNCgl2472(Tn)-1 and pDZ-PNCgl2472(Tn) were transformed into L-leucine-producing strains of *Corynebacterium glutamicum* KCCM11661P (Korean Patent No. 10-1851898) and KCCM11662P (Korean Patent No. 10-1796830) by homologous recombination on the chromosome (van der Rest et al., *Appl Microbiol Biotechnol* 52:541-545, 1999), respectively. The strains introduced with the vector on the chromosome by homologous recombination were selected in a medium containing 25 mg/L kanamycin. Then, strains in which the transposon was inserted on the chromosome was confirmed through PCR using primer 1 of SEQ ID NO: 8 and primer 2 of SEQ ID NO: 9 based on the *Corynebacterium glutamicum* transformants in which the secondary recombination was completed. The recombinant strains were named *Corynebacterium glutamicum* KCCM11661P-PNCgl2472-Tn and KCCM11662P-PNCgl2472-Tn-1, respectively.

The experiment on fermentation titer was carried out in order to compare leucine productivity of the *Corynebacterium glutamicum* KCCM11661P-PNCgl2472-Tn-1 and KCCM11662P-PNCgl2472-Tn. Each strain was sub-cultured in a nutrient medium, and then each strain was seeded into a 250 mL corner-baffle flask containing 25 mL of a production medium and cultured at 30° C. for 72 hours at 200 rpm with shaking. Thereafter, the concentration of L-leucine was analyzed using HPLC, and the analyzed concentration of L-leucine is shown in Table 7 below.

<Nutrient Medium (pH 7.2)>

Glucose 10 g, Meat Extract 5 g, Polypeptone 10 g, Sodium Chloride 2.5 g, Yeast Extract 5 g, Agar 20 g, Urea 2 g (based on 1 L of distilled water)

<Production Medium (pH 7.0)>

Glucose 50 g, $(NH_4)_2SO_4$ 20 g, Corn Steep Solids 20 g, $KH_2PO_4$ 1 g, $MgSO_4 \cdot 7H_2O$ 0.5 g, Biotin 100 μg, Thiamine-HCl 1 mg, $CaCO_3$ 15 g (based on 1 L of distilled water)

TABLE 8

L-Leucine Productivity of KCCM11661P, KCCM11661P-PNCgl2472-Tn, KCCM11662P, and KCCM11662P-PNCgl2472-Tn-1

| Strains | L-Leucine (g/L) | | | |
|---|---|---|---|---|
| | Batch 1 | Batch 2 | Batch 3 | Average |
| KCCM11661P | 2.8 | 2.6 | 2.7 | 2.7 |
| KCCM11661P-PNCgl2472-Tn | 3 | 3 | 2.9 | 3 |
| KCCM11662P | 3 | 3.1 | 2.9 | 3 |
| KCCM11662P-PNCgl2472-Tn-1 | 3.3 | 3.2 | 3.2 | 3.3 |

As a result, it was confirmed that the L-leucine productivity of KCCM11661P-PNCgl2472-Tn and KCCM11662P-PNCgl2472-Tn-1 strains were increased by about 10% as compared to KCCM11661P and KCCM11662P, respectively.

Example 5: Preparation of Transposon-Inserted Strains from L-Isoleucine-Producing Strain of Corynebacterium glutamicum KCCM11248P and Evaluation of L-Isoleucine Productivity Thereof A strain was prepared in which the L-isoleucine-producing strain of Corynebacterium glutamicum KCCM11248P (Korean Patent No. 10-1335789) was inserted by homologous recombination on the chromosome in the same manner as in Example 3-1 above, and the strain was named KCCM11248P-PNCgl2472-Tn-1.

The KCCM11248P-PNCgl2472-Tn-1 strain was cultured in the following manner to evaluate isoleucine productivity.

Each strain was seeded into a 250 mL corner-baffle flask containing 25 mL of a seed medium and cultured at 30° C. for 20 hours at 200 rpm with shaking. Then, 1 mL of the seed culture solution was seeded into a 250 mL corner-baffle flask containing 24 mL of a production medium, and cultured at 30° C. for 48 hours at 200 rpm with shaking. Compositions of the seed medium and production medium are shown below.

<Seed Medium (pH 7.0)>
Glucose 20 g, Peptone 10 g, Yeast Extract 5 g, Urea 1.5 g, $KH_2PO_4$ 4 g, $K_2HPO_4$ 8 g, $MgSO_4.7H_2O$ 0.5 g, Biotin 100 µg, Thiamine-HCl 1000 µg, Calcium Pantothenate 2000 µg, Nicotinamide 2000 µg (based on 1 L of distilled water)

<Production Medium (pH 7.0)>
Glucose 100 g, $(NH_4)_2SO_4$ 40 g, Soy Protein 2.5 g, Corn Steep Solids 5 g, Urea 3 g, $KH_2PO_4$ 1 g, $MgSO_4.7H_2O$ 0.5 g, Biotin 100 µg, Thiamine-HCl 1000 µg, Calcium Pantothenate 2000 µg, Nicotinamide 3000 µg, $CaCO_3$ 30 g (based on 1 L of distilled water).

After completion of the culture, the concentration of L-isoleucine was measured by HPLC. The measured L-lysine concentrations are shown in Table 9 below.

TABLE 9

L-Isoleucine Productivity of KCCM11248P and KCCM11248P-PNCgl2472-Tn-1

| Strains | L-Isoleucine (g/L) | | | |
|---|---|---|---|---|
| | Batch 1 | Batch 2 | Batch 3 | Average |
| KCCM11248P | 1.4 | 1.3 | 1.5 | 1.4 |
| KCCM11248P-PNCgl2472-Tn-1 | 1.9 | 1.7 | 2 | 1.87 |

As a result, it was confirmed that the L-isoleucine productivity of KCCM11248P-PNCgl2472-Tn strain was increased by about 34% compared to KCCM11248P.

From the foregoing, a skilled person in the art to which the present application pertains will be able to understand that the present application may be embodied in other specific forms without modifying the technical concepts or essential characteristics of the present application. In this regard, the exemplary embodiments disclosed herein are only for illustrative purposes and should not be construed as limiting the scope of the present application. On the contrary, the present application is intended to cover not only the exemplary embodiments but also various alternatives, modifications, equivalents, and other embodiments that may be included within the spirit and scope of the present application as defined by the appended claims.

Deposition No

Depository Institution: Korean Culture Center of Microorganisms (International Depositary Authority)
Accession No.: KCCM12707P
Deposition Date: 20200427

The invention claimed is:

1. A microorganism of the genus *Corynebacterium* for producing L-branched-chain amino acids, comprising a polynucleotide sequence represented by General Formula 1 below:

X—Z—Y—Z'   [General Formula 1]

in the General Formula 1 above,
X is SEQ ID NO: 1 or a sequence having a homology of 90% or more thereto,
Y is a transposon,
Z is the sequence from 0 to the $n^{th}$ nucleotide of SEQ ID NO: 5 or a sequence having a homology of 80% or more thereto, and Z' is the sequence from the $n+1^{th}$ nucleotide of SEQ ID NO: 5 to the $188^{th}$ nucleotide of SEQ ID NO: 5 or a sequence having a homology of 80% or more thereto,
wherein n is a natural number from 0 to 187.

2. The microorganism of claim 1, wherein n is not 0.

3. The microorganism of claim 1, wherein the Z is the sequence from 0 to the $n^{th}$ nucleotide of SEQ ID NO: 5 or a sequence having a homology of 90% or more thereto, and the Z' is the sequence from the $n+1^{th}$ nucleotide of SEQ ID NO: 5 to the $188^{th}$ nucleotide of SEQ ID NO: 5 or a sequence having a homology of 90% or more thereto.

4. The microorganism of claim 1, wherein the X, Z, or Z' is a sequence derived from a microorganism containing the same.

5. The microorganism of claim 1, wherein the Y in the polynucleotide sequence of General Formula 1 above consists of SEQ ID NO: 3.

6. The microorganism of claim 1, further comprising SEQ ID NO: 6, SEQ ID NO: 7, or a sequence having a homology of 90% or more thereto at the 3' end of Z'.

7. The microorganism of claim 6, wherein the sequence further included at the 3' end of Z' is a sequence derived from a microorganism containing the same.

8. The microorganism of claim 1, wherein the microorganism of the genus *Corynebacterium* is *Corynebacterium glutamicum*.

9. A composition for producing L-branched-chain amino acids, comprising a polynucleotide sequence represented by General Formula 1 below:

X—Z—Y—Z'   [General Formula 1]

in the General Formula above,
X is SEQ ID NO: 1 or a sequence having a homology of 90% or more thereto,
Y is a transposon,
Z is the sequence from 0 to the $n^{th}$ nucleotide of SEQ ID NO: 5 or a sequence having a homology of 80% or more thereto, and Z' is the sequence from the $n+1^{th}$ nucleotide of SEQ ID NO: 5 to the $188^{th}$ nucleotide of SEQ ID NO: 5 or a sequence having a homology of 80% or more thereto,
wherein n is a natural number from 0 to 187.

10. The composition of claim 9, wherein n is not 0.

11. The composition of claim 9, wherein the Z is the sequence from 0 to the $n^{th}$ nucleotide of SEQ ID NO: 5 or a sequence having a homology of 90% or more thereto, and the Z' is the sequence from the $n+1^{th}$ nucleotide of SEQ ID NO: 5 to the $188^{th}$ nucleotide of SEQ ID NO: 5 or a sequence having a homology of 90% or more thereto.

12. A method for producing L-branched-chain amino acids, comprising:
culturing the microorganism of the genus *Corynebacterium* of claim 1 in a medium; and
recovering L-branched-chain amino acids from the medium or a culture thereof.

13. The method of claim 12, wherein n is not 0.

14. The method of claim 12, wherein the Z is the sequence from 0 to the $n^{th}$ nucleotide of SEQ ID NO: 5, and the Z' is the sequence from the $n+1^{th}$ nucleotide of SEQ ID NO: 5 to the $188^{th}$ nucleotide of SEQ ID NO: 5.

15. The method of claim 12, wherein the X, Z, or Z' is a sequence derived from a microorganism containing the same.

16. The method of claim 12, wherein the Y in the polynucleotide sequence of General Formula 1 above consists of SEQ ID NO: 3.

17. The method of claim 12, further comprising SEQ ID NO: 6, SEQ ID NO: 7, or a sequence having a homology of 90% or more thereto at the 3' end of Z'.

18. The method of claim 17, wherein the sequence further included at the 3' end of Z' is a sequence derived from a microorganism containing the same.

19. The microorganism of claim 1, wherein the Z is the sequence from 0 to the $n^{th}$ nucleotide of SEQ ID NO: 5, and the Z' is the sequence from the $n+1^{th}$ nucleotide of SEQ ID NO: 5 to the $188^{th}$ nucleotide of SEQ ID NO: 5.

20. The composition of claim 9, wherein the Z is the sequence from 0 to the $n^{th}$ nucleotide of SEQ ID NO: 5, and the Z' is the sequence from the $n+1^{th}$ nucleotide of SEQ ID NO: 5 to the $188^{th}$ nucleotide of SEQ ID NO: 5.

* * * * *